United States Patent [19]

Cassens, Jr.

[11] 4,276,091
[45] Jun. 30, 1981

[54] REFRACTORY GUN MIX
[75] Inventor: Nicholas Cassens, Jr., Pleasanton, Calif.
[73] Assignee: Kaiser Aluminum & Chemical Corporation, Oakland, Calif.
[21] Appl. No.: 134,359
[22] Filed: Mar. 27, 1980
[51] Int. Cl.$^3$ .............................................. C04B 35/04
[52] U.S. Cl. ...................................... 106/58; 106/66; 106/67; 106/284; 106/286.2; 106/286.5; 106/286.6; 106/286.7
[58] Field of Search ................ 106/58, 66, 67, 284, 106/286.2, 286.5, 286.6, 286.7

[56] References Cited

U.S. PATENT DOCUMENTS

| | | | |
|---|---|---|---|
| 2,619,426 | 11/1952 | Greger | 106/63 |
| 3,278,320 | 10/1966 | Neely et al. | 106/66 |
| 3,357,842 | 12/1967 | Bowman | 106/58 |
| 3,357,843 | 12/1967 | Bowman | 106/58 |
| 3,879,208 | 4/1975 | Cassens | 106/58 |
| 4,001,029 | 1/1977 | Cassens | 106/67 |
| 4,030,936 | 6/1977 | Willis | 106/65 |

FOREIGN PATENT DOCUMENTS 570345  7/1945  United Kingdom .

*Primary Examiner*—Lorenzo B. Hayes
*Attorney, Agent, or Firm*—Paul E. Calrow; Malcolm McQuarrie

[57] ABSTRACT

A refractory gun mix contains from 1 to 5% alkali metal phosphate, for example monosodium phosphate, sodium tripolyphosphate, or a long chain glassy polyphosphate, from 0.5 to 5% hydrated aluminum sulfate (e.g., $Al_2(SO_4)_3 \cdot 14H_2O$), from 0.5 to 5% bentonite, and up to 10% pitch, preferably hard pitch, the balance being sized refractory grain, preferably MgO-containing and/or CaO-containing grain such as periclase, chrome ore, and/or dolomite. In a preferred embodiment, the alkali metal phosphate contributes three atoms of phosphorous for each atom of aluminum contributed by the aluminum sulfate.

6 Claims, No Drawings

REFRACTORY GUN MIX

BACKGROUND OF THE INVENTION

This invention pertains to refractory compositions, particularly such compositions suitable for gunning.

Gun mixes have been long known, and when they were first developed it was the practice to use conventional refractory bonds, for example sodium silicate or magnesium sulfate, as the bonding agent. However, gun mixes have different requirements from other refractory compositions. For example, they must mix readily with water, adhere well to a furnace wall without slumping or rebounding, and they must set to a coherent mass very rapidly.

Accordingly, special bonding systems, particularly combination bonds, have been developed for gun mixes. For example, U.S. Pat. No. 3,357,842 discloses a bonding system using monosodium phosphate, U.S. Pat. No. 3,357,843 discloses bonding using glassy polyphosphates, and U.S. Pat. No. 3,879,208 discloses a bonding system using aluminum sulfate.

Combination bond systems have also been used with other types of refractory compositions. For example, U.S. Pat. No. 2,619,426 discloses a refractory composition suitable for ramming, casting, pressing, or use as a mortar and bonded with a combination of aluminum sulfate and calcium phosphate. Also, it is known to make an air-set mortar from calcined clay, brick grog, and raw kyanite bonded with about 12% clay, 8% aluminum sulfate, and 4% dry sodium phosphate.

The present invention is directed to a phosphate-containing bonding system for refractory gun mixes, one which provides a more versatile mix with better water range and in which any alkali metal phosphate bond can be used with predictable results. The use of such phosphate-containing bonding system provides low temperature strength, as opposed to a ceramic bond, in the mix.

SUMMARY OF THE INVENTION

It has now been found, according to this invention, that an improved refractory gun mix is obtained in a composition consisting essentially of from 0.5 to 5% bentonite, from 1.5 to 10% of a bonding system, and up to 10% pitch, the balance being sized refractory aggregate, when the bonding system is from 1 to 5% alkali metal phosphate and from 0.5 to 5% aluminum sulfate, all percentages being by weight and based on the total weight of the composition.

DETAILED DESCRIPTION

The aggregate used in the practice of this invention may be any of various well-known refractory aggregates. For example, it can be an aluminosilicate aggregate such as calcined flintclay or high alumina grog. Similarly, a natural aluminosilicate such as kyanite can be used. However, the invention has found particular application in so-called basic compositions, compositions containing dolomite, periclase, and/or chrome ore, or prereacted grain made from such materials. The sizing of the aggregate will be conventional, that is to say all less than 6.7 mm ($-3$ mesh) and ranging down to submicron sizes, the proportions of the different size fractions being chosen to achieve best packing and therefore maximum density, as is well known.

Bentonite is a conventional material used in gun mixes to impart plasticity. While bentonite is commonly used because of its relatively low cost, it is possible to replace it with an organic plasticizer such as methyl cellulose. Bentonite will be added as a fine powder, for example all finer than 0.4 mm ($-35$ mesh), with 80% less than 74 microns ($-200$ mesh).

As is known, pitch may be added to the compositions of this invention, particularly when they are basic compositions. Preferably the pitch will be a hard pitch, that is to say one with a softening point greater than 80° C. The pitch will be sized so that all is less than 3.3 mm ($-6$ mesh) and preferably larger than 0.15 mm ($+100$ mesh).

The alkali metal phosphate used can be any such material. For reasons of economy, it will generally be a sodium phosphate, but other phosphates such as potassium phosphate can be used. Examples of materials which can be used are monosodium phosphate ($NaH_2PO_4$, MSP), sodium tripolyphosphate ($Na_5P_3O_{10}$, STPP), and the long chain glassy polyphosphates containing from 4 to 200 phosphorous atoms. The phosphate will be sized so that all is less than 2.4 mm ($-8$ mesh). Sodium tripolyphosphate is the preferred phosphate ingredient for practical reasons. Monosodium phosphate tends to lump in raw material storage and a long chain polyphosphate such as Glass H (sold by FMC Corp.) tends to be more expensive.

The aluminum sulfate is a hydrated version of this compound containing from 10 to 18 waters of hydration. The material $Al_2(SO_4)_3.14H_2O$ is particularly useful. It is a standard material of commerce and will be used as a powder all of which is finer than 2.4 mm ($-8$ mesh). Unhydrated aluminum sulfate is too slowly soluble to be used.

The composition of the present invention is particularly useful as a nozzle mix, wherein water is added to the composition at the gunning nozzle.

One of the advantages of the present bonding system is that it provides a good setting rate for the mix. In gunning refractory compositions the bond must not harden too fast, for example in less than a second, because it is very difficult to get subsequently gunned material to adhere to the previously gunned material. On the other hand, if the bonding system sets too slowly, for example taking longer than 20 seconds, the material will not adhere well and build up to good thickness, rather slumping or running off the gunned surface when that surface is vertical. It is known that a mix bonded with aluminum sulfate alone sets too fast, and that mixes bonded with alkali metal phosphates alone set either too fast or too slow, depending on the type of phosphate. For example a gun mix bonded with monosodium phosphate sets much too fast, whereas one bonded with a long chain glassy polyphosphate sets much too slowly. On the other hand, the bonding system of the present invention uses a wide variety of alkali metal phosphates and shows a good, intermediate setting time. In addition, gun mixes bonded with alkali metal phosphate show a very narrow water range.

As used in the specification, the following terms with regard to setting rate have the following meanings: "fair" (F) means that the setting rate is relatively fast, but still acceptable, for example from 1 to 5 seconds; "good" (G) means an optimum setting time, for example from 5 to 10 seconds; "slower" (Sr) means that the setting rate is acceptable but tends to be on the slow side, for example taking from about 10 to 20 seconds; and "slow" (S) means that the material takes more than 20 seconds to set.

Although it is not desired to be bound to any specific theory, it is believed that the present bonding system works by a reaction between the aluminum sulfate and the alkali metal phosphate to produce aluminum phosphate, $Al(PO_3)_3$. The aluminum phosphate thus produced provides a highly viscous mass for holding the refractory aggregate in place. Furthermore, it is believed that when the refractory composition contains magnesia (MgO) or calcia (CaO), there is a second reaction between the magnesia and the aluminum phosphate, a setting reaction which imparts good strength to the gunned composition. Thus, the advantage of the present bonding system is that, no matter what alkali metal phosphate is used, the same aluminum phosphate product is formed as the material which holds the aggregate in place. The advantage of a reaction-type bond in a gun mix is that it is not necessary to wait for the gunned refractory to be heated to a temperature at which a ceramic bond develops before it acquires good strength.

The following chemical reactions illustrate this postulated reaction for various typical alkali metal phosphates: In the case of monosodium phosphate:

$$Al_2(SO_4)_3 \cdot 14H_2O + 6NaH_2PO_4 \rightarrow 2Al(PO_3)_3 + 3(Na_2SO_4 \cdot 2H_2O) + 14H_2O \tag{1}$$

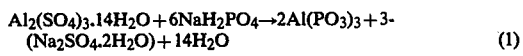

In the case of sodium tripolyphosphate:

$$Al_2(SO_4)_3 \cdot 14H_2O + 2Na_5P_3O_{10} \rightarrow 2Al(PO_3)_3 + 3(Na_2SO_4 \cdot 2H_2O) + 4NaOH + 6H_2O \tag{2}$$

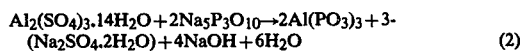

In the case of a long chain glassy polyphosphate, the exact chemical formula of which can be approximated by the formula $NaPO_3$:

$$Al_2(SO_4)_3 \cdot 14H_2O + 6NaPO_3 \rightarrow 2Al(PO_3)_3 + 3(Na_2SO_4 \cdot 2H_2O) + 8H_2O \tag{3}$$

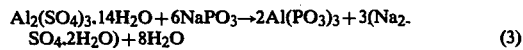

It can be seen that in each case the same aluminum phosphate and sodium sulfate are formed, and that in each case each atom of aluminum provided by the aluminum sulfate reacts with three atoms of phosphorous provided by the alkali metal phosphate. From these equations and the formula weight of the reactants and products, it can readily be calculated that the weight ratio of alkali metal phosphate to aluminum sulfate with 14 waters of hydration is approximately 1 in the case of long chain glassy polyphosphate, approximately 1.2 in the case of monosodium phosphate, and approximately 1.25 in the case of sodium tripolyphosphate.

One of the unique features of the bond according to the present invention is that it goes through two distinct stages. When first gunned, it forms a highly viscous mass which tends to reduce rebound and promote adherence of the subsequently gunned material. While it is not certain, it is believed that this viscous stage represents the above chemical reaction forming aluminum phosphate. The second stage occurs in preferred compositions, those which include an MgO-containing or CaO-containing material such as dolomite, periclase or chrome ore. Again, the exact chemical reaction is not certain, but it is believed that in these compositions a subsequent reaction occurs between the aluminum phosphate and the magnesia which results in a "set" of the bond, imparting strength to the gunned material and permitting thicker layers to be gunned without danger of sliding or slumping of the gunned material off the wall or roof on which it is placed. In other words, the most desirable condition for gunning is to be able to gun into a mix with a very viscous consistency, which then rapidly sets to a rigid structure.

With respect to the water range, the terms used in the specification have the following meanings: The term "wide" (W) means a variation in acceptable water content of $\pm 7$–10% from the mean; the term "moderate" (M) means a variation in acceptable water content of $\pm 4$–7% about the mean; the term "narrow" (N) means a variation of $\pm 2$–4%; and the term "very narrow" (VN) means less than $\pm 2\%$ variation in the acceptable water content.

The term "recovery" as used in this specification indicates the property of gunnable compositions, while they are being gunned, to start to slide off the furnace wall and then stop and "recover" their adherence to the wall. Compositions with poor recovery tend to continue to slide off the wall completely, whereas compositions with good recovery will remain in place even though they have slumped or slid somewhat. In effect, good recovery in a gun mix means that the composition has a wider water range than otherwise, since sliding or slumping is generally the result of excessive water, either due to too high a water setting or transient surges in the gunning operation.

EXAMPLES

Table I sets forth the compositions (in parts by weight) and certain properties of various mixes according to this invention, together with certain comparison mixes.

TABLE I

| Composition | 1 | 2 | 3 | 4 | 5 | 6 | 7 | 8 | 9 | 10 | 11 |
|---|---|---|---|---|---|---|---|---|---|---|---|
| Aggregate:- | | | | | | | | | | | |
| Periclase | 95 | 95 | 95 | 90 | 86 | 52.6 | — | — | 92 | 95 | 92.5 |
| Chrome Ore | — | — | — | — | 9 | 42.4 | 95 | — | — | — | — |
| 60% $Al_2O_3$ Grain | — | — | — | — | — | — | — | 75 | — | — | — |
| Bauxite, pulv'd | — | — | — | — | — | — | — | 10 | — | — | — |
| Clay, Plastic | — | — | — | — | — | — | — | 10 | — | — | — |
| Bond:- | | | | | | | | | | | |
| Aluminum Sulfate | 1.3 | 1.8 | 1.5 | 1.3 | 1.3 | 1.3 | 1.3 | 1.3 | 5.0 | 1.34 | 0.5 |
| STPP | 1.7 | — | — | 1.7 | 1.7 | 1.7 | 1.7 | 1.7 | 1.0 | 1.66 | 5.0 |
| MSP | — | 1.2 | — | — | — | — | — | — | — | — | — |
| Glass H | — | — | 1.5 | — | — | — | — | — | — | — | — |
| Dicalcium Phosphate | — | — | — | — | — | — | — | — | — | — | — |
| Bentonite | 2 | 2 | 2 | 2 | 2 | 2 | 2 | 2 | 2 | 2 | 2 |
| Pitch | — | — | — | 5 | — | — | — | — | — | — | — |
| P/A ratio | 1.3 | 0.67 | 1.0 | 1.3 | 1.3 | 1.3 | 1.3 | 1.3 | 0.2 | 1.25 | 10.0 |
| Properties:- | | | | | | | | | | | |
| Rebound (%) | 18.4 | 29.6 | 33.4 | 15.5 | 21.5 | 24.5 | 13.4 | 23.1 | 17.6 | — | 13.9 |
| Water Range | W | M | M | M | M | M | W | W | N | — | W |

TABLE I-continued

| Setting | G | F | G | G | G | F | Sr | S | F | — | Sr |
|---|---|---|---|---|---|---|---|---|---|---|---|
| Composition | 12 | 13 | 14 | 15 | 16 | 17 | 18 | 19 | 20 | 21 | 22 |
| Aggregate:- | | | | | | | | | | | |
| Periclase | 95 | 95 | 94.6 | 95 | 95 | 94.6 | 93 | 96 | 97 | 95 | 94 |
| Chrome Ore | — | — | — | — | — | — | — | — | — | — | — |
| 60% Al$_2$O$_3$ Grain | — | — | — | — | — | — | — | — | — | — | — |
| Bauxite, pulv'd | — | — | — | — | — | — | — | — | — | — | — |
| Clay, Plastic | — | — | — | — | — | — | — | — | — | — | — |
| Bond:- | | | | | | | | | | | |
| Aluminum Sulfate | 2.0 | 1.86 | 1.3 | 1.7 | 1.48 | 1.7 | 1.3 | 1.3 | 1.3 | 2 | 3 |
| STPP | — | — | — | — | — | — | 1.7 | 1.7 | 1.7 | — | — |
| MSP | 1.0 | 1.14 | 2.1 | — | — | — | — | — | — | — | — |
| Glass H | — | — | — | 1.3 | 1.52 | 1.7 | — | — | — | — | — |
| Dicalcium Phosphate | — | — | — | — | — | — | — | — | — | 1 | 1 |
| Bentonite | 2 | 2 | 2 | 2 | 2 | 2 | 4 | 1 | 0 | 2 | 2 |
| Pitch | — | — | — | — | — | — | — | — | — | — | — |
| P/A ratio | 0.5 | 0.61 | 1.6 | 0.76 | 1.03 | 1.0 | 1.3 | 1.3 | 1.3 | 0.5 | 0.33 |
| Properties:- | | | | | | | | | | | |
| Rebound (%) | 32.8 | — | 20.5 | 32.3 | — | 24.9 | 15.4 | 21.9 | 32.6 | 23.4 | 27.3 |
| Water Range | M | — | M | M | — | M | VW | N | N | N | N |
| Setting | Sr | — | G | F | — | G | Sr | F | F | S | S |

Specifically, Compositions 1 through 19 are compositions according to the present invention, whereas Compositions 20, 21 and 22 are comparison compositions outside the scope of the invention.

The periclase used was a single-fire grain produced from magnesium hydroxide obtained by reacting calcined dolomite and sea water. It had the following typical chemical analysis: 1% CaO, 2.1% SiO$_2$, 0.4% Al$_2$O$_3$, 0.4% Cr$_2$O$_3$, 0.6% Fe$_2$O$_3$, 0.15% B$_2$O$_3$, and (by difference) 95.35% MgO. The chrome ore used was a lump masinloc chrome ore having the following typical chemical composition: 21.4% MgO, 0.7% CaO, 5.8% SiO$_2$, 27.7% Al$_2$O$_3$, 30.4% Cr$_2$O$_3$, 14.0% Fe$_2$O$_3$. The periclase was sized so that all was less than 0.13 mm (−6 mesh) and about 30% was less than 147 microns (−100 mesh). The chrome ore was sized so that all was less than 0.59 mm (−28 mesh) and about 10% less than 147 microns (−100 mesh), except in Composition 7, where about 30% was less than 147 microns.

The 60% Al$_2$O$_3$ grain used was Mulcoa 60, a beneficiated aluminosilicate grain less than 3.3 mm (−6 mesh) in size, 9.1% being less than 0.2 mm (−65 mesh). A typical analysis is 60.5% Al$_2$O$_3$, 35.8% SiO$_2$, 2.3% TiO$_2$, 1.3% Fe$_2$O$_3$ and 0.1% CaO and MgO. The pulverized bauxite was a natural Guyana bauxite containing 89.9% Al$_2$O$_3$ and being over 50% less than 44 microns (−325 mesh) in size. The plastic clay was a Missouri plastic fireclay finer than 0.83 mm (−20 mesh) and containing 35% Al$_2$O$_3$.

The aluminum sulfate and the various phosphates were used in granular form, all being substantially finer than 2.4 mm (8 mesh). The bentonite used was a standard material of commerce all finer than 0.4 mm (35 mesh). The pitch was a pellet pitch with a softening point of 150° C., all smaller than 3.3 mm (6 mesh).

The compositions in Table I illustrate various amounts and proportions of the aluminum sulfate and phosphate agents in the bond, and also the use of different phosphate materials. The "P/A" ratio in Table I is the weight ratio of the phosphate to the aluminum sulfate in the composition. For the preferred 3:1 p:Al atom ratio, the weight ratio for STPP is 1.24, for MSP is 1.21 and for Glass H is 1.03.

Compositions 18, 19 and 20 illustrate the effect of extremes in the amount of bentonite, the water range increasing as the bentonite is increased, and the rebound becoming greater as the amount of bentonite is reduced to zero.

Compositions 21 and 22 illustrate the substitution of dicalcium phosphate for the alkali metal phosphate. These compositions are similar to those disclosed in U.S. Pat. No. 2,619,426 and have a narrow water range, slow set, relatively high rebound and poor or very poor recovery.

Table I gives the cold gunning properties for various compositions. The relatively high rebound shown for Compositions 2, 3, 12, and 15 were due to equipment problems experienced when these compositions were gunned, and should not be regarded as typical of these compositions. The rebound of the other compositions is more typical. Compositions 5, 6, 12, 13, 15, and 16 were hot gunned (i.e., onto a hot furnace wall); they gunned well with good water range and good build-up, and burned in without spalling or cracking.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. Analyses of mineral components are reported in the usual manner, expressed as simple oxides, e.g. MgO and SiO$_2$, although the components may actually be present in various combinations, e.g. as a magnesium silicate.

I claim:

1. A refractory composition suitable for gunning consisting essentially of from 0.5 to 5% bentonite, from 1.5 to 10% of a bonding system, and up to 10% pitch, the balance being sized refractory aggregate, characterized in that the bonding system is from 1 to 5% alkali metal phosphate and from 0.5 to 5% aluminum sulfate, all percentages being by weight and based on the total weight of the composition.

2. Composition according to claim 1 wherein the alkali metal phosphate is at least one of the group monosodium phosphate, sodium tripolyphosphate, and long chain sodium polyphosphates.

3. Composition according to claim 1 wherein the refractory grain is at least one of the group periclase and chrome ore.

4. Composition according to claim 2 wherein the refractory grain is at least one of the group periclase and chrome ore.

5. Composition according to claim 1, 2, 3 or 4 wherein the alkali metal phosphate is present in an amount to provide about three atoms of phosphorous for each atom of aluminum provided by the aluminum sulfate.

6. Composition according to claim 5 wherein the aggregate is periclase.

* * * * *